Patented Nov. 11, 1941

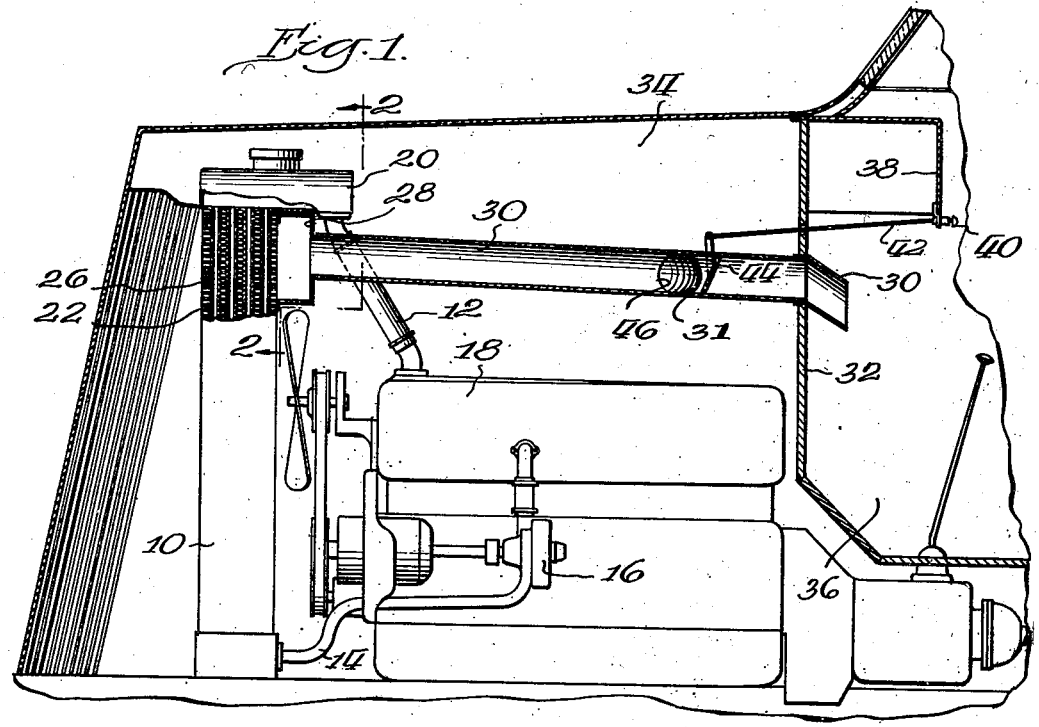
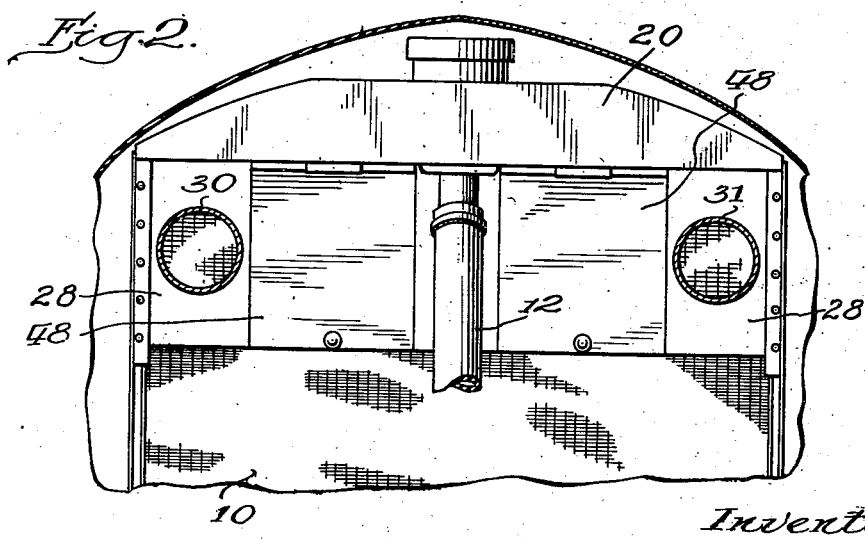

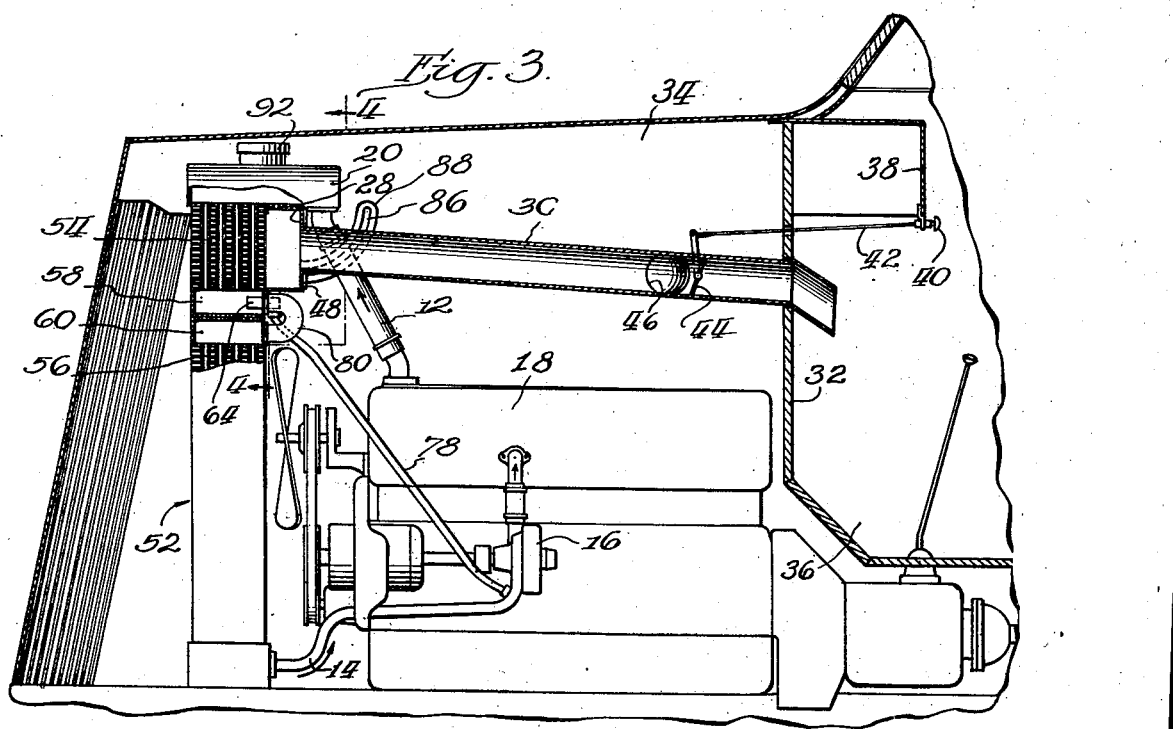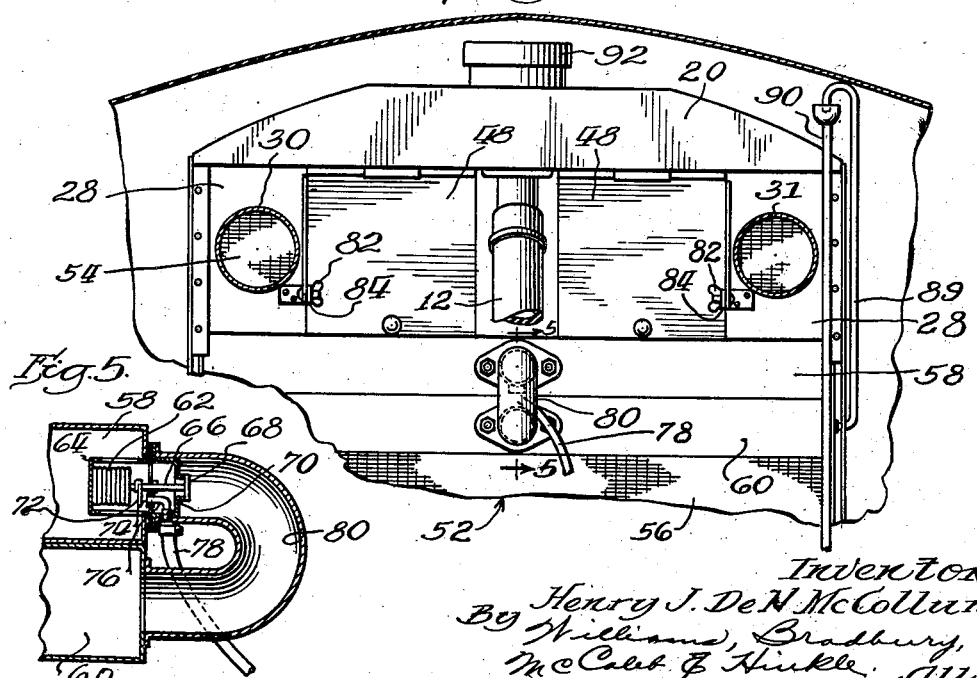

2,262,028

UNITED STATES PATENT OFFICE 2,262,028

AUTOMOBILE HEATING SYSTEM

Henry J. De N. McCollum, Evanston, Ill.

Application July 31, 1939, Serial No. 287,555

9 Claims. (Cl. 237—12.3)

My invention relates generally to heating systems for automobiles, and more particularly to a heating system in which the heat is obtained from the radiator forming part of the engine cooling system.

It is an object of my invention to provide a heater for the passenger compartment of an automobile, which may be inexpensively manufactured and easily installed.

A further object of my invention is to provide a hot air heating system for the passenger compartment of an automobile which may be installed as factory equipment to form a permanent part of the automobile and which is provided with adjustable means whereby the rate of flow of heated air to the passenger compartment may be readily controlled.

A further object is to provide an improved heating system for the passenger compartment of an automobile in which the rate of heat transferred from the water circulating in the cooling system of the engine may be increased by providing a separate radiator section with thermostatically controlled means to maintain the section at a predetermined relatively high temperature.

Other objects will appear from the following description, reference being had to the accompanying drawings in which—

Figure 1 is a fragmentary sectional view of a portion of an automobile showing the heating system of my invention applied thereto;

Figure 2 is a fragmentary sectional view taken on the line 2—2 of Figure 1;

Figure 3 is a sectional view of an automobile heating system illustrating a modified form of my invention;

Figure 4 is a fragmentary sectional view taken on the line 4—4 of Figure 3; and

Figure 5 is a sectional view taken on the line 5—5 of Figure 4.

In the simple form of my invention disclosed in Figures 1 and 2, the passenger compartment is heated by flow thereinto of air from outside the vehicle through the upper portion of the radiator which forms part of the engine cooling system. Thus in these figures the radiator 10 which may be of any convenient construction connected in the engine cooling system in the usual manner by means of hoses 12 and 14 through which the water is circulated by water pump 16. The water heated by the engine 18 flows upwardly through the pipe 12 into a tank or header 20 and flows downwardly through the tubes 22 forming part of the radiator core and which are surrounded by the usual fins 26.

The entire width of the upper section of the radiator has its rear surface covered by a rectangular casing 28 so that all of the air flowing through this upper section of the radiator flows into the casing and thence through a pair of conduits 30, 31. The conduit 30 extends from the casing 20 through the dash 32 which divides the engine compartment 34 from the passenger compartment 36. Within the passenger compartment, and secured to the instrument panel 38 is a control button 40 which is connected by a Bowden or similar control wire 42 with a butterfly valve 44 so as to control the rate of flow of air through the conduit 30. The pipe or conduit 31 is preferably joined to the conduit 30 by an elbow or Y fitting 46, although if desired both conduits 30 and 31 may lead directly into the passenger compartment of the vehicle and each be provided with a butterfly air flow control valve.

The casing 28 is preferably provided with a pair of removable doors 48 which may be removed during the summer driving season when the heating system is not to be used.

From the foregoing description, it will be apparent that the upper section of the radiator core which, as most radiators are constructed contains the hottest water, is utilized as a heat exchange device for heating a supply of fresh air for the passenger compartment of the vehicle. This portion of the radiator thus serves the dual purpose of cooling the water in the engine cooling system and of heating the air supplied to the passenger compartment.

The circulation of air through the upper section of the radiator and through the conduits 30 and 31 is caused primarily by the motion of the automobile, since the usual radiator fan is not effective to aid in causing such flow. Since the differential pressure between the forward end of the radiator and the interior of the passenger compartment is usually not very great, the rate of flow through the conduits 30 and 31 will not be excessive, and the air, in its relatively slow flow through the upper section of the radiator core, will be heated substantially to the temperature of the water entering the radiator.

In Figs. 3, 4 and 5 is illustrated a modified form of the invention, in which provision is made for maintaining the water in the upper section of the radiator at the maximum temperature compatible with efficient engine operation. In this figure, the casing 28 and conduits 30 and 31 and the butterfly valve 44 for controlling the flow of air to the passenger compartment may be similar to the corresponding parts previously described, and similar reference characters have therefore been applied to such of the parts as have been previously described.

The radiator 52 is of special construction and is composed of an upper core 54 and a lower core 56, the cores being separated by a pair of headers or manifolds 58 and 60. Water from the engine flows upwardly through the hose 12 to the header or tank 20 and thence downwardly through the tubes in the core 54 to the header 58. As best shown in Fig. 5, the header 58 is provided with a bellows or Sylphon 62 which is mounted in a suitable frame 64 which projects into the header 58. The Sylphon 62 contains a suitable volatile liquid or mixture of volatile liquids such as alcohol and ether, so that it will expand when a predetermined high temperature is attained. For example, it may be constructed so as to expand rapidly when heated to a temperature of approximately 180° to 190° F. The Sylphon has a valve stem 66 secured thereto, the stem carrying a valve 68 which cooperates with a valve seat 70. The stem 66 also carries a valve 72 which is adapted to close a port 74 at the end of an elbow 76 which in turn is connected to a hose 78 leading to the intake side of the water circulating pump 16.

Except for the interposition of the valve 68 the headers 58 and 60 are connected by a return bend fitting 80.

The doors 48, instead of being removable, described with reference to Figs. 1 and 2, are preferably permanently hinged to the rear wall of the casing 28 and are adapted to be swung to open position and secured in open position by a bolt 82 provided with a wing nut and extending through an angle clip 84 welded or riveted to the door 48 and also through an arcuate slot 86 formed in a bracket 88. By tightening the wing nuts on the bolts 82, the doors 48 may be conveniently clamped in open position.

In normal use of the heater, the operator will pull the control knob 40 so as to open the butterfly valve 44 and permit the flow of air through the upper core section 54 and through the conduits 30 and 31 into the passenger compartment. The water flowing through the upper section 54 of the radiator, at the commencement of operation of the vehicle, will not be heated to its maximum temperature, and thus the thermostatically operated valve 68 will remain closed and the valve 72 will remain open. The water will thus be prevented from circulating through the lower core section 56, but instead will flow downwardly through the hose 78 into the inlet of the water pump 16. Because of the limited amount of cooling surface available in the upper core 54, the water in the jacket of the engine will be heated to its maximum temperature at a relatively rapid rate. As soon as the temperature is raised to that at which the Sylphon 62 will expand, the valve 68 will open to permit flow of some of the water of the engine cooling system through the lower core 56 as well as the upper core 54.

When the temperature of the water in the header 58 becomes very high, the valve 72 will close, thus assuring that all of the water circulated by the pump 16 will flow through both cores 54 and 56. In this way, the upper core section 54 is always maintained at a temperature very nearly that of the water leaving the jacket of the engine, while at the same time the full cooling effect of both core sections 54 and 56 is available whenever the engine cooling system requires the dissipation of additional heat in order to maintain it at a satisfactory operating temperature.

In view of the fact that the radiator cores 54 and 56 are not at all times interconnected and pressure due to expansion in the lower core 56 is not relieved through the usual overflow pipe, an additional overflow pipe 89 is preferably provided as shown in Fig. 4, being connected to the lower header 60 and extending upwardly into the funnel shaped upper end of a drain pipe 90. Furthermore, since the flow through the upper core 54 is restricted by the valve 68, pressure may be built up in the upper tank or header 20, and for this reason the radiator cap 92 should be of such construction that it forms a water tight seal.

The thermostatic Sylphon 62, it will be apparent, performs all of the functions of the thermostatic valve customarily provided in the water cooling systems of internal combustion engines to control the water temperature, since the amount of heat withdrawn from the core 54 is much less than is dissipated by the customary radiator and because the flow therethrough is restricted by the relatively small size of the passageway through the elbow 76 and the hose 78. As a result, the water circulation through the upper core 54 will be comparatively slow until the water attains a temperature approaching the maximum allowable for efficient operation of the engine.

From the foregoing description, it will appear that I have provided a very simple and effective system for the heating of the passenger compartments of automobiles, which may be manufactured at a relatively low cost, and which may be installed as standard equipment upon the automobile by departing but slightly from standard construction.

While I have shown and described preferred embodiments of my invention, it will be apparent to those skilled in the art that numerous modifications and variations may be made without departing from the underlying principles of the invention. I therefore desire by the following claims to include within the scope of my invention all such varied constructions by means of which substantially the results of my invention may be obtained by substantially the same or equivalent means.

I claim:

1. In a heating system for an automobile the combination comprising, an engine water cooling radiator having two divided sections, connecting means providing a passageway for the flow of water between the sections, and a thermostatically controlled valve responsive to an increase in the temperature of the water in the upper section above a predetermined value and a by-pass connecting the upper section and the water circulating pump of the engine for controlling the flow of water through the connecting means and from one section to the other to increase the rate of heating of water in one of the sections.

2. In a heating system for an automobile the combination comprising, an engine water cooling radiator having divided upper and lower sections, connecting means providing a passage for the flow of water between the sections, means for controlling the flow of water through the connecting means and from the upper section to the lower section to increase the rate of heating of the water in the upper section, and an overflow tube communicating with the lower section and extending upwardly to a place above the normal water level in the upper section.

3. In a heating system for an automobile the combination comprising, an engine water cooling radiator having divided upper and lower sections, connecting means providing a passage for the flow of water between the sections, and an overflow tube communicating with the lower section and extending upwardly to a place above the normal water level in the upper section.

4. In a heating system for an automobile the combination comprises, an engine water cooling radiator having divided upper and lower sections, connecting means providing a passage for the flow of water between the sections, a by-pass for the lower section communicating with the upper section, and a thermally controlled valve means responsive to the temperature of the water in the upper section for controlling the flow of water through the connecting means and by-pass and to restrict the flow through the connecting means for effecting quicker heating of the water in the upper section.

5. A heating system for an automobile having an engine compartment and a passenger compartment comprising, in combination, an engine water cooling radiator having separate upper and lower sections, means connecting said sections and including an automatic thermostatic valve responsive to an increase in the temperature of the water in the upper section above a predetermined value for controlling the flow of water through said means from one section to the other, a by-pass permitting water to circulate through said upper section without passing through said lower section, means adjacent one of the sections providing an air chamber, means for conducting air from said chamber to the passenger compartment, and means for controlling the flow of air through the air conducting means.

6. A heating system for an automobile having an engine compartment and a passenger compartment comprising, in combination, an engine water cooling radiator having upper and lower sections, headers on said sections dividing the radiator into two separate cores, means on said headers connecting said sections, means for controlling the flow of water from one of the sections to the other to increase the rate of heating of the water in the upper section when the temperature of the water therein is below a predetermined value, a bypass permitting water to circulate through said upper section without passing through said lower section, a housing adjacent the upper section and providing an air chamber, a conduit for conducting air from said chamber to the passenger compartment, and means for controlling the flow of air through the conduit.

7. A heating system for an automobile having an engine compartment and a passenger compartment comprising, in combination, an engine water cooling radiator having upper and lower sections separated from each other, means for connecting said sections, means for controlling the flow of water from one of the sections to the other to increase the rate of heating of the water in the upper section when the temperature of the water therein is below a predetermined value, a bypass permitting water to circulate through said upper section without passing through said lower section, a housing adjacent the upper section and providing an air chamber, a conduit for conducting air from said chamber to the passenger compartment, adjustable means for controlling the flow of air from said chamber and away from said conduit, and means for controlling the flow of air through the conduit.

8. A heating system for an automobile having an engine compartment and a passenger compartment comprising, in combination, an engine water cooling radiator having upper and lower sections separated from each other, means connecting said sections, a bypass permitting water to circulate through said upper section without passing through said lower section, means comprising a thermostatically controlled valve in said connecting means to control the flow of water from one of the sections to the other to increase the rate of heating of the water in the upper section when the temperature of the water therein is below a predetermined value, a housing adjacent the upper section and providing an air chamber, a conduit for conducting air from said chamber to the passenger compartment, and means for controlling the flow of air through the conduit.

9. In a heating system for an automobile, the combination comprising, an engine water cooling radiator having upper and lower sections, a conduit connecting said sections, a valve controlling the flow through said conduit, a bypass permitting water to circulate through one of said sections without passing through the other section, a valve controlling said bypass, and means responsive to the temperature of the water in one of said sections for operating said valves in predetermined sequence.

HENRY J. DE N. McCOLLUM.